(12) United States Patent
Hayes et al.

(10) Patent No.: US 7,800,816 B2
(45) Date of Patent: Sep. 21, 2010

(54) DISPLAY DEVICE BASED ON ELECTROWETTING EFFECT

(75) Inventors: Robert A. Hayes, Eindhoven (NL); Mickael Joulaud, Monjavi (IT); Thibault J B Roques-Carmes, Nancy (FR); Stephanie A. Palmier, Ramonville (FR)

(73) Assignee: Liquavista B.V., Eindhoven (NL)

( * ) Notice: Subject to any disclaimer, the term of this patent is extended or adjusted under 35 U.S.C. 154(b) by 380 days.

(21) Appl. No.: 11/547,602

(22) PCT Filed: Apr. 1, 2005

(86) PCT No.: PCT/IB2005/051091

§ 371 (c)(1),
(2), (4) Date: Apr. 21, 2008

(87) PCT Pub. No.: WO2005/098524

PCT Pub. Date: Oct. 20, 2005

(65) Prior Publication Data

US 2008/0225374 A1  Sep. 18, 2008

(30) Foreign Application Priority Data

Apr. 5, 2004 (EP) .................... 04101407

(51) Int. Cl.
*G02F 1/29* (2006.01)
*G02F 1/00* (2006.01)
*G02B 26/02* (2006.01)

(52) U.S. Cl. ............ 359/320; 359/321; 359/228; 359/253; 359/272; 359/245

(58) Field of Classification Search ........... 359/228, 359/252, 253, 245, 272, 296, 321, 665, 666; 345/41, 48, 55, 84, 85, 105, 107; 106/16, 106/18.11, 31.25, 31.26, 31.28, 31.9, 31.64, 106/140.1, 156.3, 614, 617; 166/250.01, 166/252.6; 204/157.67

See application file for complete search history.

(56) References Cited

U.S. PATENT DOCUMENTS 3,458,328 A * 7/1969 Zola .......................... 106/16

(Continued)

FOREIGN PATENT DOCUMENTS

EP  1 180 713 A  2/2002

(Continued)

OTHER PUBLICATIONS

R. A. Hayes et al., "Video-speed Electronic Paper Based on Electrowetting", Nature, Macmillan Journals Ltd., London, GB, vol. 425 (6956), pp. 383-385 (2003).

(Continued)

*Primary Examiner*—Loha Ben
(74) *Attorney, Agent, or Firm*—BainwoodHuang

(57) ABSTRACT

In a reflective a display device based on layer break up or layer displacement having at least two different states, in which one of the fluids (5) e. g oil in a first state adjoins at least a first support plate (3) and in the second state the other fluid (6) at least partly adjoins the first support plate, in which picture elements are separated by areas (13) having a hydrophilic surface dyes (or sometimes pigments) are added to the oil (usually hydrocarbon but also possibly silicone or fluorocarbon), to provide sufficient optical intensity.

6 Claims, 2 Drawing Sheets

U.S. PATENT DOCUMENTS

Figure 3:
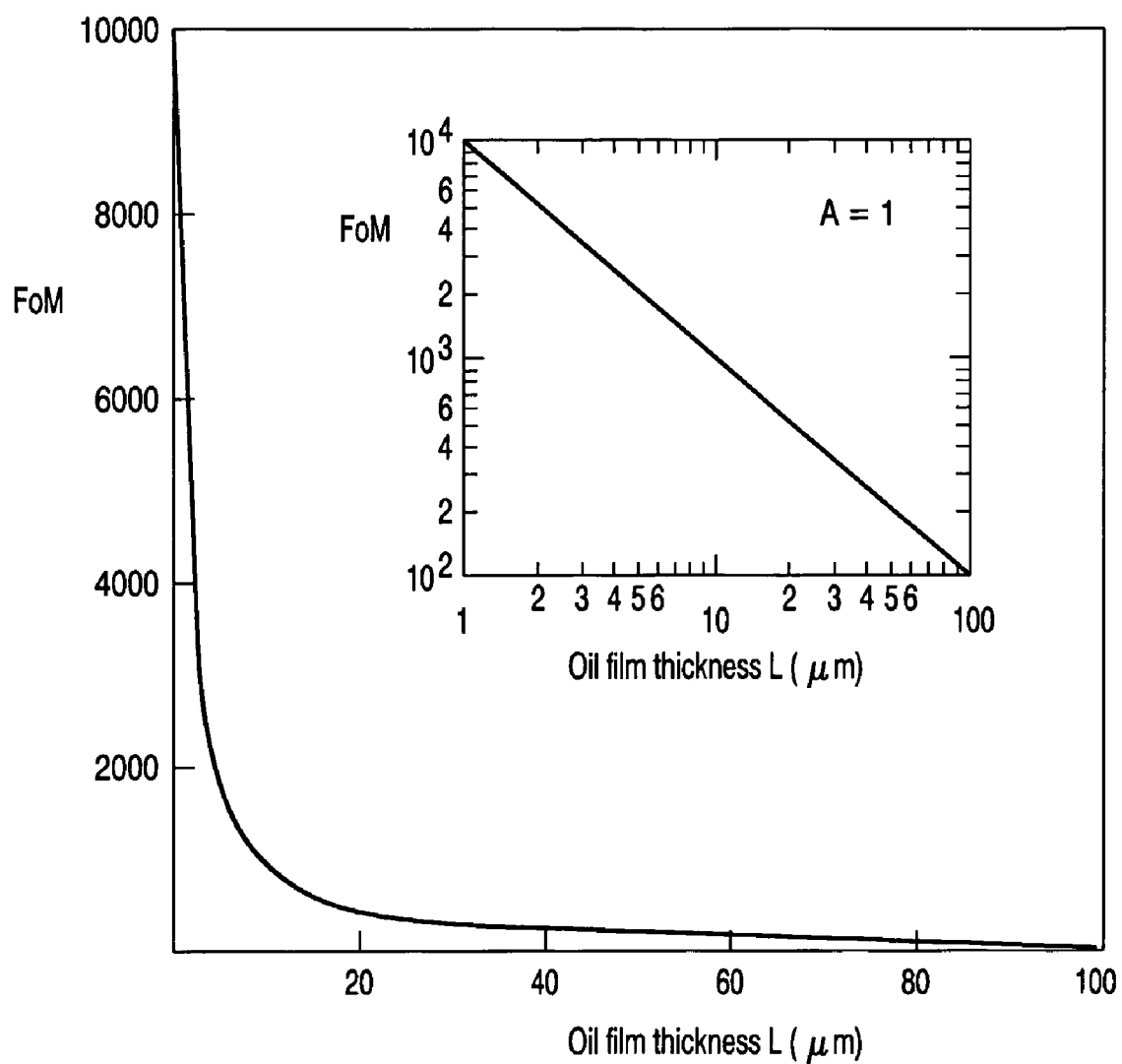

| | | | |
|---|---|---|---|
| 3,838,029 A * | 9/1974 | Fischer et al. | 204/157.67 |
| 5,389,546 A * | 2/1995 | Becket | 436/51 |
| 6,400,885 B1 | 6/2002 | Hu et al. | |
| 6,449,081 B1 * | 9/2002 | Onuki et al. | 359/245 |
| 6,514,328 B1 * | 2/2003 | Katoh et al. | 106/31.28 |
| 2005/0104804 A1 | 5/2005 | Feenstra et al. | |

FOREIGN PATENT DOCUMENTS

| | | | |
|---|---|---|---|
| EP | 1 180 713 A2 * | 2/2002 | |
| WO | 03/071346 | 8/2003 | |
| WO | 2004/027489 A | 4/2004 | |
| WO | WO 2004/027489 A1 * | 4/2004 | |

OTHER PUBLICATIONS

T. Roques-Carmes et al., "Liquid Behavior Inside a Reflective Display Pixel Based on Electrowetting", Journal of Applied Physics, vol. 95 (8), pp. 4389-4396 (2005).

* cited by examiner

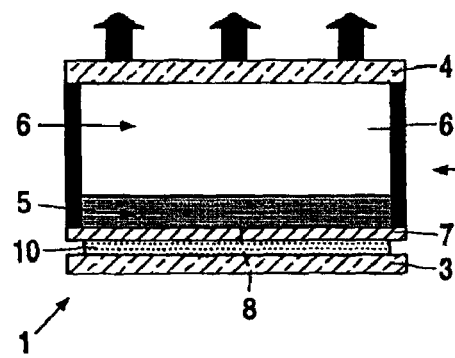
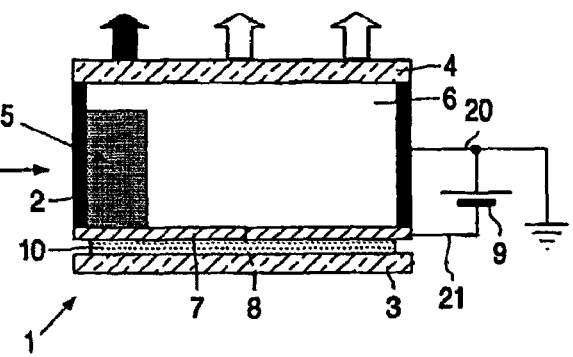
FIG. 1a  FIG. 1b
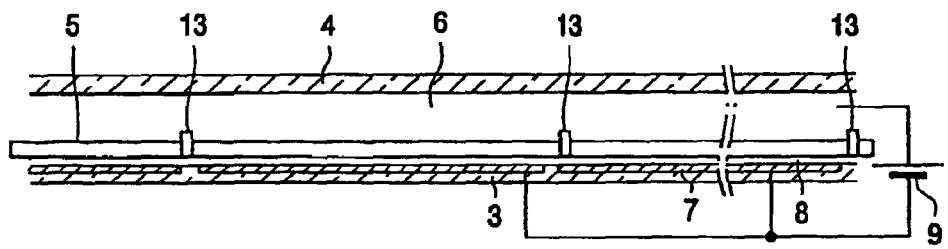
FIG. 2

DISPLAY DEVICE BASED ON ELECTROWETTING EFFECT

This application is the US national phase of international application PCT/IB2005/051091 filed 1 Apr. 2005, which designated the U.S. and claimed priority of EP 04101407.7 filed 5 Apr. 2004, the entire contents of each of which are hereby incorporated by reference.

The invention relates to an optical switch comprising at least one first fluid and a second fluid immiscible with each other within a space between a first transparent support plate and a second support plate, the second fluid being electroconductive or polar.

In particular the invention relates to a display device comprising picture elements (pixels) having at least one first fluid and a second fluid immiscible with each other within a space between a first transparent support plate and a second support plate, the second fluid being electroconductive or polar.

Optical switches may be used in shutter applications, diaphragms, but also in switchable color filters in e.g. display applications. If the fluid is a (colored) oil and the second fluid is water (due to interfacial tensions), a two-layer system is provided which comprises a water layer and an oil layer. However, if a voltage is applied between the water and an electrode on the first support plate, the oil layer moves aside or breaks up due to electrostatic forces. Since parts of the water now penetrate the oil layer, the picture element becomes partly transparent.

Display devices based on this principle have been described in PCT-Application WO PCT/IB 03/00196, now PCT Publication WO 03/071346 (PH-NL 02.0129).

When used in a reflective display the optical performance of a picture element depends a. o. on the optical intensity of the colored film in the non-reflective state (off state) dyes (or sometimes pigments) are added to the oil (usually hydrocarbon but also possibly silicone or fluorocarbon), to provide sufficient optical intensity. Using the electro-wetting display principle the brightness in the reflective state (on state) is dependent on the scattering properties of the (underlying) substrate and the area fraction occupied by residual oil. This implies that the use of as little oil as possible will yield a high brightness. Contrast however also depends on the intensity and homogeneity of the optical intensity of the colored film in non-reflective state, so for high contrast a thicker layer of oil would be preferable.

It is one of the objects of the present invention to overcome at least partly the above-mentioned requirement.

To this end an optical device according to the invention comprises oil comprising a dye the concentration of the dye being at most 1 M (mol/L). It can be shown that such oils can be used to find a good compromise between the requirements mentioned above. Suitable oils are e.g. alkane based oils colored with non-polar dyes, for example Oil Blue N (alkylamine substituted anthraquinone), Solvent Green, Sudan Red and Sudan Black. the concentration of the dye should exceed 0.01M to obtain a good color quality.

For independently characterizing a solution a Figure of Merit (FoM) is defined as (FoM=$\epsilon$.C) in which $\epsilon$ is the extinction coefficient of the dye and C is the concentration of the dissolved dye in the first fluid. Preferably, for a layer thickness of 10 μm of the first fluid, the device has a Figure of Merit (FoM=$\epsilon$.C) of at least 100 cm$^{-1}$, more preferably at least 500 cm$^{-1}$ and most preferably at least 1000 cm$^{-1}$.

These and other aspects of the invention are apparent from and will be elucidated with reference to the embodiments described hereinafter.

In the drawings:

FIG. 1 is a diagrammatic cross-section of a part of a display device, to show the principle on which a display device according to the invention is based, FIG. 2 shows a further diagrammatic cross-section of a part of such a display device, and FIG. 3 is a diagram showing the relationship between the Figure of Merit (FoM=$\epsilon$.C) and oil film thickness, l, required to meet a certain optical activity criterion (Absorbance, or Optical Density, A=1).

The Figures are diagrammatic and not drawn to scale. Corresponding elements are generally denoted by the same reference numerals.

FIG. 1 shows a diagrammatic cross-section of a part of a display device 1 which shows the principle on which a display device according to the invention is based. Between two transparent substrates or support plates 3, 4 a first fluid 5 and a second fluid 6 are provided, which are immiscible with each other. The first fluid 5 is for instance an alkane like hexadecane or as in this example colored oil. The second fluid 6 is electroconductive or polar, for instance water or a salt solution (e.g. a solution of KCl in a mixture of water and ethyl alcohol).

In a first state, when no external voltage is applied (FIG. 1a, off state) the fluids 5, 6 adjoin the first and second transparent support plates 3, 4 of e.g. glass or plastic. On the first support plate 3 a transparent electrode 7, for example indium (tin) oxide is provided and an intermediate less wettable (hydrophobic) layer 8, in this example an amorphous fluoropolymer (AF1600).

When a voltage is applied (voltage source 9) via interconnections 20, 21 the layer 5 moves aside or breaks up into small droplets (FIG. 1b, on state). This occurs when the electrostatic energy gain is larger than the surface energy loss due to the creation of curved surfaces. As a very important aspect it was found that reversible switching between a continuous film 5 covering the support plate 3 and a film adjoining the wall 2 is achieved by means of the electrical switching means (voltage source 9).

FIG. 2 shows an embodiment of a display device according to the invention, in which walls between separate picture elements have been omitted for the greater part for the sake of clarity. In this embodiment the pixel walls 13 do not extend across the whole pixel thickness. Such walls may be obtained by offset printing or other printing techniques known in the art. It appears that the oil film 5 is very stable, which is enhanced even further as the pixel size decreases. So during switching the oil remains confined in each area. The other reference numerals have the same meaning as those in FIG. 1.

The display has been made reflective by adding a reflector 10 as shown in FIG. 1. The optical performance of a display pixel depends essentially on the optical intensity of the colored film in the off state as well as the reflectivity and exposed part of the reflector 10 upon switching. Dyes (or sometimes pigments) are added to the oil (usually hydrocarbon but also possibly silicone or fluorocarbon), to provide sufficient optical intensity.

The contrast (CR) of a display pixel however also depends on the intensity and homogeneity of the pixel in its off state and can be calculated as:

$$CR=(R_{white}/R_{black})(1-\text{coverage}) \quad (1)$$

where "$R_{white}$" and "$R_{black}$" are the reflectivities of the uncovered area of a pixel in the on state and for the off state respectively, and "coverage" is the area occupied by oil in the 'on-state. For an oil residue of about 25% the following contrast values can then be obtained as a function of white and black reflectivities:

TABLE 1

| $T_{film}$ (%) | $R_{black}$ | $R_{white}$ | | |
|---|---|---|---|---|
| | | 0.5 | 0.7 | 0.9 |
| 40 | 0.16 | 2.3 | 3.3 | 4.2 |
| 30 | 0.09 | 4.2 | 5.8 | 7.5 |
| 20 | 0.04 | 9.4 | 13.1 | 16.9 |
| 10 | 0.01 | 38 | 53 | 67.5 |

$T_{film}$ in Table 1 corresponds to the percentage of light transmitted during a single pass through the absorbing layer (film). Contrast ratios of about 10 are required for paper-like optical characteristics. Because reflected light must pass through the colored oil film twice the black reflectivity $R_{black}$ is extremely low for an absorbing layer (film) having $T_{film}$=10% (absorbance A=1). It also appears that the contrast depends most strongly on the reflectivity of the dark state and much less so on white reflectivity and residual oil coverage.

FIG. 3 shows the relationship between the Figure of Merit (FoM=$\epsilon$.C) and oil film thickness, l, required to meet a certain optical activity criterion (Absorbance, or Optical Density, A=1).

Increasing the optical activity of the pixel 'off-state' can be done by using dyes that combine high extinction coefficient ($\epsilon$) with high oil solubility. Dye absorbance (A) is commonly related to concentration using the Beer-Lambert Law:

$$A=\log_{10}(I_o/I)=\epsilon.C.1 \quad (2)$$

where $I_o$ is the incident intensity, I the transmitted intensity, C the concentration and l the optical path length. Thus when the concentration is expressed in molar units M per litre (mol/L) and length in cm, $\epsilon$ has units of $M^{-1}cm^{-1}$.

With respect to the intensity of the colored oils an absorbance of 1 (10% transmission) is chosen as a good example. This means that as light incident on the display must pass twice through the oil film before reaching the viewer that virtually all light (i.e. 99%) is absorbed in the specific absorbing range of the colorant (producing red, green, or blue in the case of a display based on primary colors and cyan, magenta or yellow in the case of a display using subtractive colors as the reflected colors). For a given oil film thickness (10 μm) and therefore path length, the following Figure of Merit (FoM) is used in this patent application to define the optical intensity:

$$FoM=\epsilon.C \; [cm^{-1}] \quad (3)$$

where $\epsilon$ is the extinction coefficient of the dye which is intrinsic and C is the concentration of the dissolved dye in the oil phase in M (mol/L).

With a film absorbance of 1 (90% absorption in a film thickness of 10 μm) which can be achieved, for example, with a dye concentration of 0.01 M and dyes having extinction coefficients of $10^4$-$10^5$, Figure of Merits were obtained between 100 $cm^{-1}$ and 1000 $cm^{-1}$.

To obtain a good solution of for instance powered Oil Blue N (alkylamine substituted anthraquinone) in an alkane such as decane the following recipe was employed to increase the solubility. A dispersion or partial solution was first put in a sonic bath, then on a heating plate for while stirring it and then cooled to room temperature and filtered at e.g. 0.2 μm to remove undissolved dye. In this way Figure of Merits of about 225 were obtained.

An alternative methodology involves the use of non-polar liquid dyes, for example Sudan Red 500, Sudan Blue 673 and Sudan Yellow 172 (supplied by BASF). In this case the dyes can be much higher in concentration with FoM's of 7500 $cm^{-1}$, 15000 $cm^{-1}$ and 30000 $cm^{-1}$, respectively and the formulation of these dyes consists of dilution to the desired FoM in the alkane of choice, and purification steps to remove volatile contaminants and particulate residues. In this way the colored oil solutions are sufficiently concentrated to meet the 10% transmission criterion in film thicknesses less than 2 microns.

Several variations to the principle are possible. Although a reflective device has been described the invention also applies to transmissive display devices.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. An optical switch comprising at least one first fluid (5) and a second fluid (6) immiscible with each other within a space between a first transparent support plate (3) and a second support plate (4), the second fluid being electroconductive or polar, the first fluid being an oil comprising a dye, the concentration of the dye being at most 0.2 M (mol/L).

2. An optical switch according to claim 1, the concentration of the dye being at most 0.1 M.

3. An optical switch according to claim 1, the concentration of the dye being at least 0.01 M.

4. An optical switch according to claim 1 in which the oil comprises at least one of the group silicone oil, hydrocarbon oil or fluorocarbon oil.

5. An optical switch according to claim 1 in which the first fluid has a Figure of Merit (FoM=$\epsilon$.C) of at least $10^2$ $cm^{-1}$ in which $\epsilon$ is the extinction coefficient of the dye and C is the concentration of the dissolved dye in the first fluid.

6. A display device comprising picture elements having at least one first fluid and a second fluid immiscible with each other within a space between a first transparent support plate and a second support plate, the second fluid being electroconductive or polar, a picture element having an optical switch according to claim 1.

* * * * *